United States Patent
Gu

(10) Patent No.: US 11,618,302 B2
(45) Date of Patent: Apr. 4, 2023

(54) PTC HEATER

(71) Applicant: Hanon Systems, Daejeon (KR)

(72) Inventor: Jung Sam Gu, Daejeon (KR)

(73) Assignee: Hanon Systems, Daejeon (KR)

( * ) Notice: Subject to any disclaimer, the term of this patent is extended or adjusted under 35 U.S.C. 154(b) by 511 days.

(21) Appl. No.: 16/642,985

(22) PCT Filed: Aug. 31, 2018

(86) PCT No.: PCT/KR2018/010145
§ 371 (c)(1),
(2) Date: Feb. 28, 2020

(87) PCT Pub. No.: WO2019/045518
PCT Pub. Date: Mar. 7, 2019

(65) Prior Publication Data
US 2020/0338961 A1    Oct. 29, 2020

(30) Foreign Application Priority Data

Aug. 31, 2017 (KR) .......... 10-2017-0111457

(51) Int. Cl.
*B60H 1/22* (2006.01)
*F24H 3/04* (2022.01)
(Continued)

(52) U.S. Cl.
CPC ......... *B60H 1/2221* (2013.01); *F24H 3/0435* (2013.01); *F24H 3/0441* (2013.01); *F24H 3/0464* (2013.01); *F24H 9/1872* (2013.01); *H01C 7/02* (2013.01); *H05B 3/46* (2013.01); *F24H 2250/02* (2013.01); *F24H 2250/04* (2013.01); *H05B 2203/02* (2013.01)

(58) Field of Classification Search
CPC .... F24H 1/2221; F24H 3/0435; F24H 3/0464; F24H 9/1872; H05B 3/46
See application file for complete search history.

(56) References Cited

U.S. PATENT DOCUMENTS

| | | | |
|---|---|---|---|
| 2012/0061366 A1* | 3/2012 | Kohl | ............... H05B 3/50 219/202 |
| 2015/0043898 A1* | 2/2015 | Gu | ............... B60H 1/2225 392/360 |
| 2015/0343883 A1 | 12/2015 | Gu et al. | |

FOREIGN PATENT DOCUMENTS

| | | |
|---|---|---|
| JP | 2008071553 A | 3/2008 |
| KR | 10-2007-0080039 A | 8/2007 |

(Continued)

OTHER PUBLICATIONS

Machine translation of KR 2015-0098856 (Year: 2015).*

*Primary Examiner* — Erin E McGrath
(74) *Attorney, Agent, or Firm* — Norton Rose Fulbright US LLP; James R. Crawford

(57) ABSTRACT

The present invention relates to a PT heater and, more specifically, to a PTC heater which: mechanically fixes a heating element, a terminal, an insulating layer, and a heat-radiating unit, which constitute the PTC heater, by bending a fixing projection of a hook structure formed at a heat rod; and further has an auxiliary fixing protrusion capable of fixing the position of the heating element so as to increase the adhesiveness between the PTC element and the heat-radiating unit, thereby enabling performance to improve and facilitating assembly through the heat rod.

7 Claims, 11 Drawing Sheets

(51) Int. Cl.
 *F24H 9/1863* (2022.01)
 *H01C 7/02* (2006.01)
 *H05B 3/46* (2006.01)

(56) References Cited

FOREIGN PATENT DOCUMENTS

| KR | 20100064597 A | 6/2010 |
| KR | 20150006748 A | 1/2015 |
| KR | 10-2015-0013764 A | 2/2015 |
| KR | 10-2015-0098856 A | 8/2015 |
| KR | 10-2016-0145891 A | 12/2016 |

\* cited by examiner

PRIOR ART

PRIOR ART

PTC HEATER

TECHNICAL FIELD

The present invention relates to a positive temperature coefficient (PTC) heater, and more particularly, to a PTC heater used in an air-conditioner of a vehicle to improve indoor heating performance at the time of initial starting of the vehicle.

BACKGROUND ART

In a heating unit provided in a vehicle to perform indoor heating, a heat exchange medium for lowering a temperature of an engine circulates in a heater core to heat ambient air to heat an indoor area.

However, during the initial starting of a vehicle, it takes a certain amount of time for a heat exchange medium for cooling an engine to be heated, and especially in the winter, heating of the heat exchange medium at the time of the initial starting of the vehicle is delayed, degrading initial indoor heating performance.

To this end, a positive temperature coefficient (PTC) heater using a PTC element may be used as a heating part.

The PTC element has a characteristic that resistance thereof is sharply increased when a temperature, which is rising, reaches a certain level, and thus, at the temperature of the certain level or higher, resistance is increased and the amount of a flowing current is reduced.

Thus, as the amount of current is reduced, a heating value is reduced to cause the temperature to fall, and here, when the temperature falls, the resistance rises again to start heat generation, forming a circulation mechanism.

Therefore, the use of the PTC element as an auxiliary heater for a vehicle may supplement indoor heating while a heat exchange medium (coolant) is not heated so a heater of the vehicle does not generate heat in winter or at the initial stage of starting.

FIG. 1 is a view showing a related art PTC heater including a terminal unit for supplying power, a heat source part 11 including a PTC element heated by power supplied from the terminal unit, a heat dissipation part 12 in contact with the heat source part 11 to dissipate heat generated by the heat source part 11, and a housing 13 provided to surround the terminal unit, the heat source part 11, and the heat dissipation part 12.

Here, the housing has a plurality of heat dissipation holes on a surface thereof so that heat of the heat dissipation part 12 may be effectively dissipated outwardly from the housing, and a temperature of air may be increased by the heat dissipation part 12 while air passes through the heat dissipation holes.

In addition, as shown in FIG. 2, the heat source part 11 is configured as the PTC element 40, and the PTC element 40 is interposed inside an insulator 30, a negative electrode terminal 50 and a positive electrode terminal 52 are coupled to upper and lower surfaces of the insulator 30, respectively, an insulating film 20 is inserted to an outer side thereof, and a casing 40 is then inserted and coupled to an outer side thereof.

Here, since the PTC element 40, an insulator 30 terminal, the insulating film 20, and the like are fixed and located in the casing 10, a deformation of or outer damage to the casing 10 may cause contact imbalance among the PTC element, the terminal, and the insulating film 20 to degrade performance of the PTC heater

DISCLOSURE

Technical Problem

An object of the present invention is to provide a positive temperature coefficient (PTC) heater in which a heating element, a terminal, an insulating layer, and a heat dissipation part are mechanically fixed by bending a fixing protrusion having a hook structure formed at a heat rod.

Another object of the present invention is to provide a PTC heater in which an auxiliary fixing protrusion for fixing a position of a heating element is further provided in addition to a heat rod including a fixing protrusion, thereby increasing adhesion between a PTC element and a heat dissipation part to improve performance.

Still another object of the present invention is to provide a PTC heater in which a heating element, a terminal, an insulating layer, and a heat dissipation part are mechanically fixed using a heat rod and an increase in a height of the heat rod due to a fixing protrusion is prevented by changing a shape of the heat dissipation part.

Technical Solution

In one general aspect, a positive temperature coefficient (PTC) heater includes: an insulating support 100 having a predetermined length; a heating element 200 interposed in the insulating support 100 and generating heat by power; a terminal 300 located in close contact with a lower surface of the insulating support 100 and supplying power to the heating element 200; an insulating layer 400 located in close contact with a lower surface of the terminal 300; heat dissipation supports 500 located in close contact with an upper surface of the insulating support 100 and a lower surface of the insulating layer 400, respectively, and having a plurality of discharge holes on both side surfaces thereof to exchange heat from the heating element 200 with a fluid; and an assembly 600 located in close contact with a lower surface of a lower heat dissipation support 500, protruding in an upward direction to pass through the discharge holes, and inwardly bent to be coupled to an upper surface of an upper heat dissipation support 500.

Furthermore, the insulating support 100 may include an insulating support body 110 having a predetermined length and a space portion 120 penetrating through upper and lower surfaces inside the insulating support body 110 and allowing the heating element 200 to be interposed therein.

Furthermore, the heat dissipation support 500 may include an upper heat dissipation support 510 including an upper heat dissipation support body 511 located in close contact with the upper surface of the insulating support 100 and a plurality of upper discharge holes 512 formed as the foregoing discharge holes on both side surfaces of the upper heat dissipation support body 511 and a lower heat dissipation support body 520 including a lower heat dissipation support body 521 located in close contact with the lower surface of the insulating layer 400 and a plurality of lower discharge holes 522 formed as the foregoing discharge holes on both side surfaces of the lower heat dissipation support body 521.

Furthermore, the assembly 600 may include: an assembly body 610 positioned to be located in close contact with a lower surface of the lower heat dissipation support body 521 and a fixing protrusion 620 protruding from the assembly body 610 to pass through the lower discharge hole 522 and the upper discharge hole 512 and bent to be coupled to an upper surface of the upper heat dissipation support body 511.

Furthermore, the fixing protrusion 620 may be provided in plurality and the plurality of fixing protrusions 620 are spaced apart from each other in a lengthwise direction.

Furthermore, the insulating support 100 may further include an auxiliary fixing protrusion 130 protruding from the insulating support body 110 to pass through the upper discharge hole 512 and bent to be coupled to the upper surface of the upper heat insulating support body 511.

Furthermore, the auxiliary fixing protrusion 130 may be provided in plurality, and the plurality of auxiliary fixing protrusions may be spaced apart from each other in a lengthwise direction.

Furthermore, the auxiliary fixing protrusions 130 may be spaced apart from each other so as not to overlap the fixing protrusion 620.

Furthermore, the auxiliary fixing protrusions 130 may be formed to avoid the space portion 120.

Furthermore, the upper heat dissipation support body 511 may be bent so that a surface thereof in contact with the insulating support 100 is located on a lower side, and the lower heat dissipation support body 521 may be bent so that a surface thereof in contact with the insulating layer 400 is located on an upper side.

Furthermore, a height of a bent portion of the upper heat dissipation support body 511 may be equal to or greater than a thickness of the fixing protrusion 620 and the auxiliary fixing protrusion 130.

Furthermore, a height of a bent portion of the lower heat dissipation support body 521 may be equal to or greater than a thickness of the assembly body 610.

Furthermore, the terminal 300 may have a length equal to a length of the insulating support body 110 and may be connected to the plurality of the heating elements 200.

Furthermore, the insulating layer 400 may be formed of an insulating material.

Furthermore, the insulating layer 400 may be a Kapton tape.

Advantageous Effects

In the PTC heater according to the present disclosure, the heating element, the terminal, the insulating layer, and the heat dissipation part configuring the PTC heater are mechanically fixed by bending the fixing protrusions having a hook structure formed at the heat rod, and in addition, the auxiliary fixing protrusions for fixing a position of the heating element are further provided, whereby adhesion between the PTC element and the heat dissipation part may be increased to enhance performance and to facilitate assembly through the heat rod.

In addition, in the PTC heater according to the present disclosure, the heating element, the terminal, the insulating layer, and the heat dissipation part are mechanically fixed using the heat rod, an increase in height due to the fixing protrusions of the heat rod may be prevented by changing the shape of the heat dissipation part.

In addition, in the PTC heater according to the present disclosure, since the increase in height due to the heat rod is prevented, the PTC heater may be configured to be compact and space utilization in a vehicle in which the PTC heater is installed may be improved.

BEST MODE

Hereinafter, exemplary embodiments of a positive temperature coefficient (PTC) heater will be described in detail with reference to the accompanying drawings.

First Exemplary Embodiment

Figure 1:
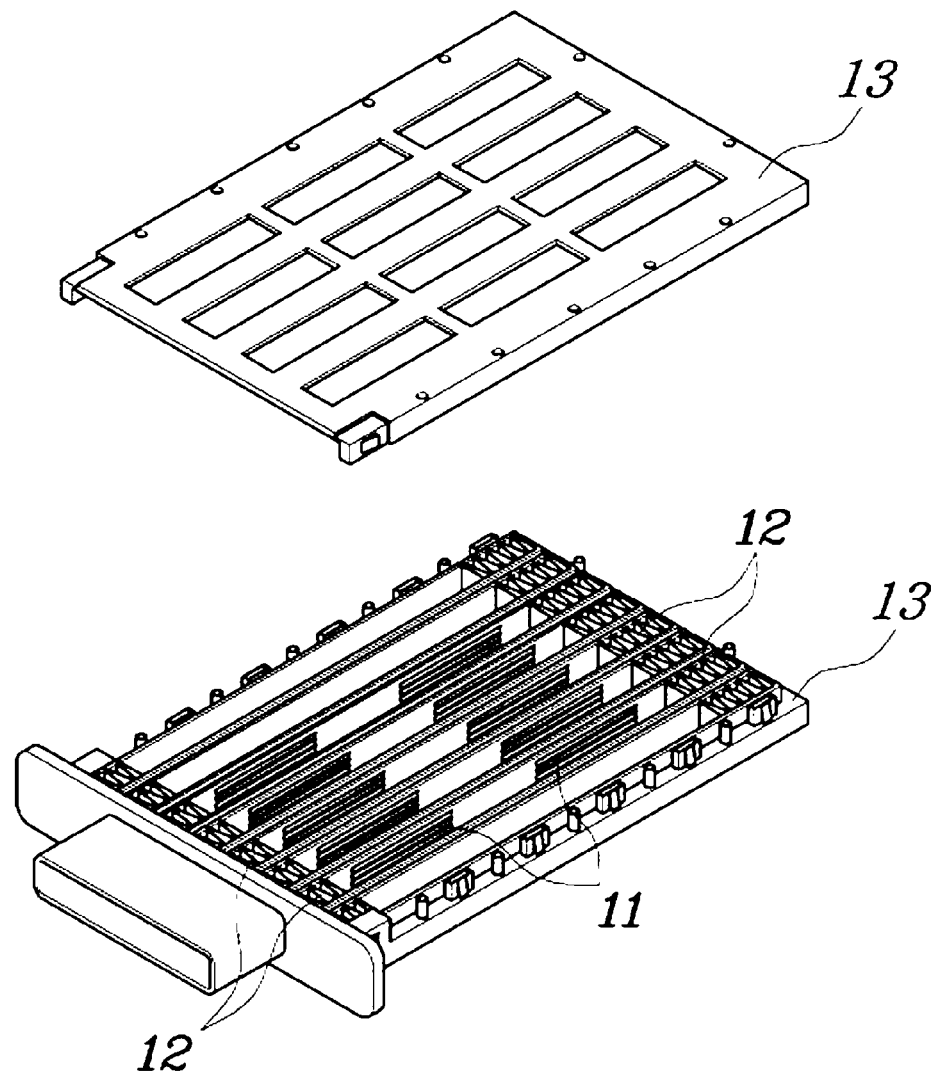
FIGS. 1 and 2 are views showing a positive temperature coefficient (PTC) heater of the related art.
Figure 2:
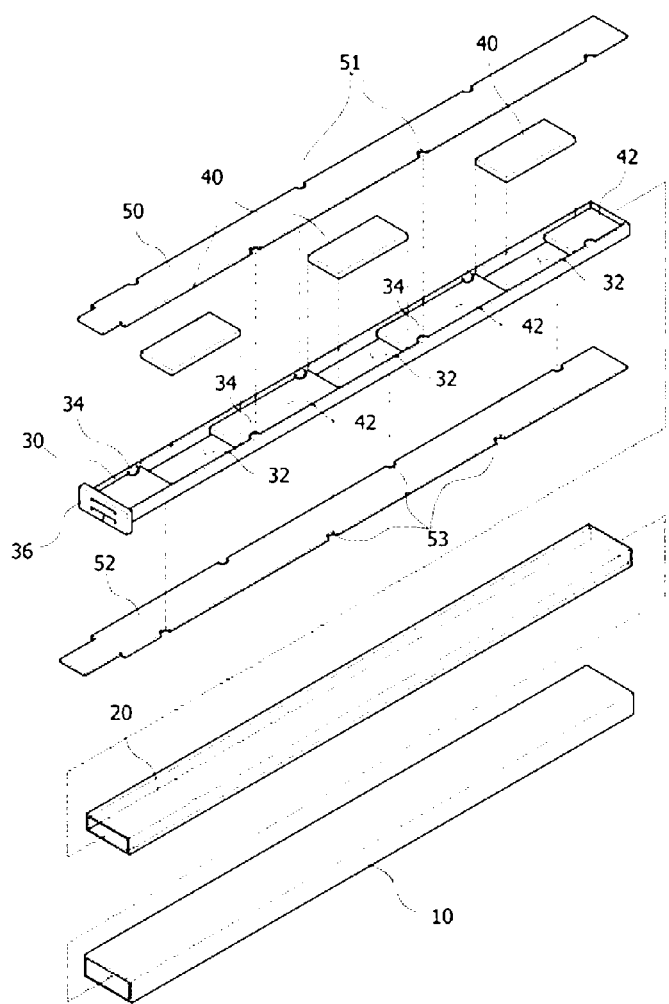
Figure 3:
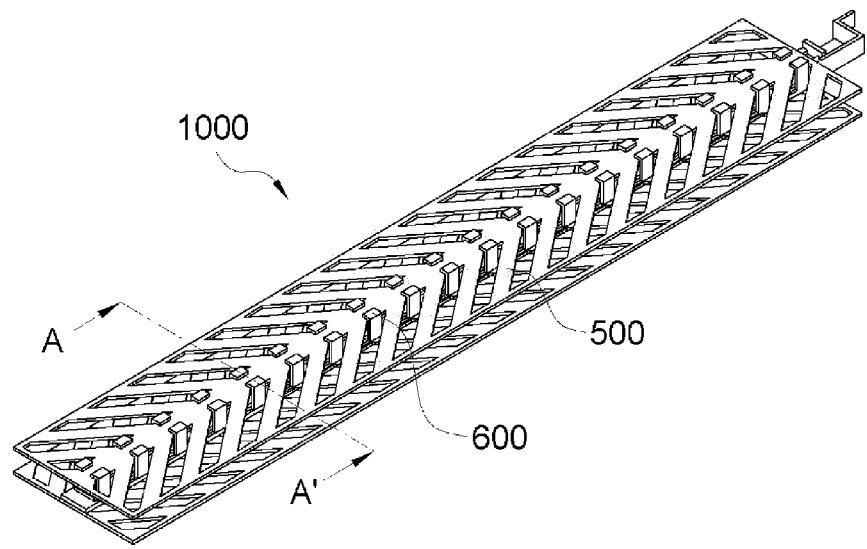
FIG. 3 is a perspective view of a PTC heater according to a first exemplary embodiment of the present disclosure.
Figure 4:
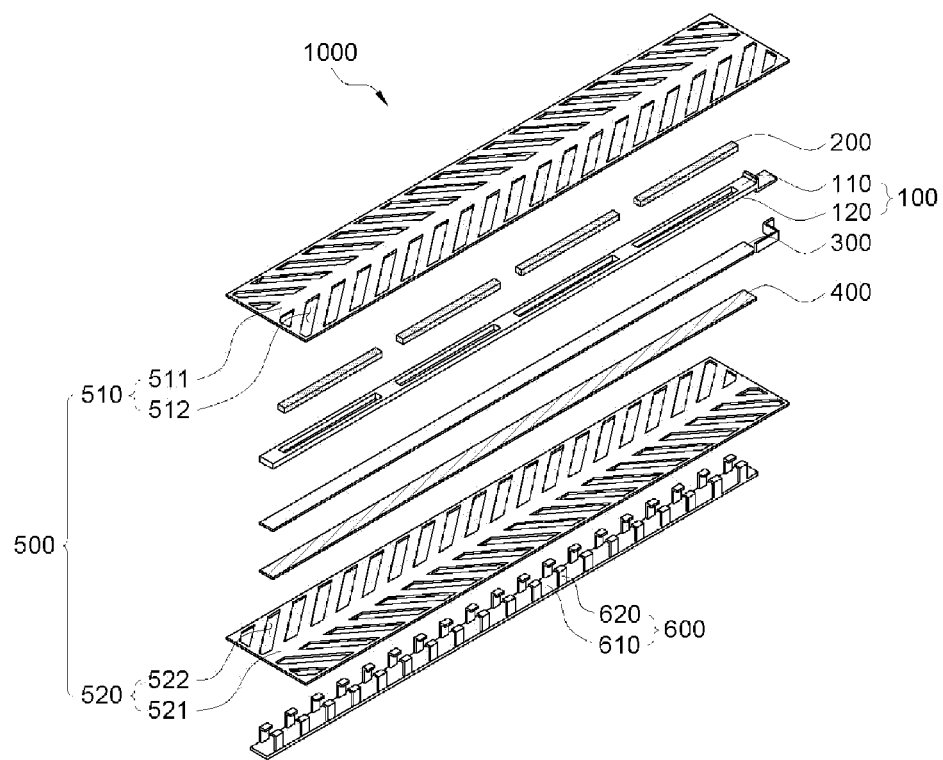
FIG. 4 is an exploded perspective view of the PTC heater according to the first exemplary embodiment of the present disclosure.
Figure 5:
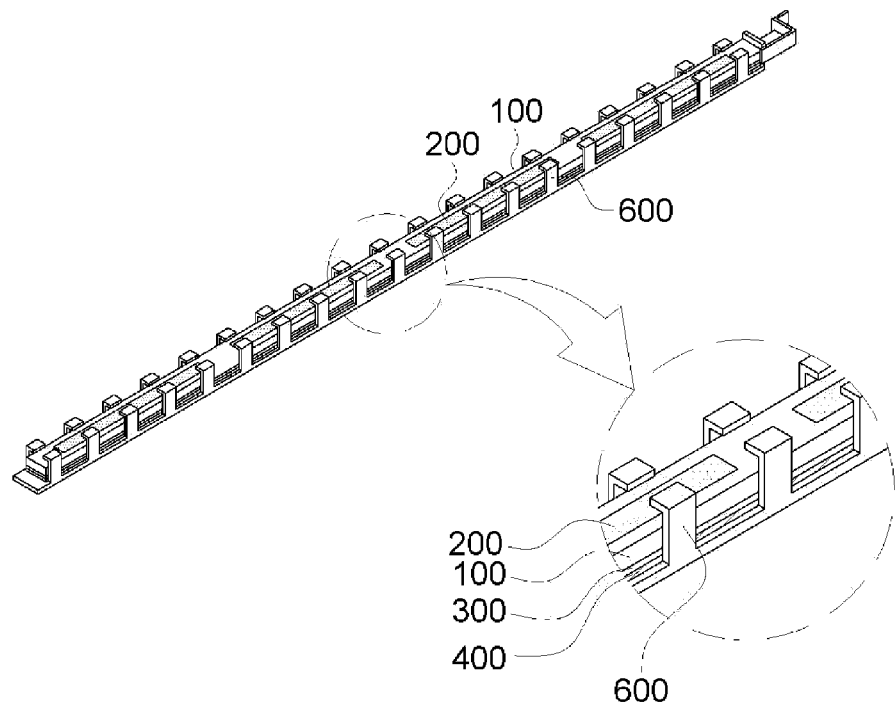
FIG. 5 is a perspective view of some components of the PTC heater according to the first exemplary embodiment of the present disclosure.

FIG. 3 is a view showing a perspective view of the PTC heater according to a first exemplary embodiment of the present disclosure, FIG. 4 is a view showing an exploded perspective view of the PTC heater according to the first exemplary embodiment of the present disclosure, FIG. 5 is a perspective view showing a part of a configuration of the PTC heater according to the first exemplary embodiment of the present disclosure.

As illustrated in FIGS. 3 through 5, a PTC heater 1000 according to the first exemplary embodiment of the present disclosure includes an insulating support 100, a heating element 200 interposed in the insulating support 100 and generating heat by power, a terminal 300 supplying power to the heating element 200, an insulating layer 400, heat dissipation supports 500, and an assembly 600 coupling the heat dissipation supports 500.

Specifically, the insulating support 100 is a body in which a heating element (i.e., a positive temperature coefficient (PTC)) 200 is interposed and seated therein and includes an insulating support body 110 and a space portion 120.

The insulating support body 110 may have a length corresponding to a length of the PTC heater 1000 according to the first exemplary embodiment of the present disclosure, and the space portion 120 may be provided as one or a plurality of space portions inside the insulating support body 110 and penetrate through upper and lower surfaces so that the heating element 200 is interposed therein.

The heating element 200 is an electric element that emits heat when power is input, and may have a shape corresponding to the space portion 120 so as to be interposed in the space portion 120 of the insulating support 100.

The terminal 300 may be located in close contact with a lower surface of the insulating support 100 and may be configured as a terminal supplying power to the heating element 200.

Here, the insulating support body 110 may further include a seating portion (not shown) allowing the terminal 300 to be seated and located therein, but the present disclosure is not limited thereto and the terminal 300 may have the same length as that of the insulating support body 110 in a lengthwise direction and connected to the plurality of heating elements 200.

As described above, the terminal 300 is in close contact with the heating element 200 and supplies power to the heating element 200, and thus the heating element 200 may have a thickness with which the heating element 200 may be in close contact with the terminal 300 and smoothly supplied with power.

The insulating layer 400 may be located in close contact with a lower surface of the terminal 300, may be formed of an insulating material allowing the terminal 300 to be insulated, and may have a thin pad shape.

In addition, the insulating layer 400 may not only perform insulation electrically safely but be formed of a material having high thermal conductivity, so that heat generated from the heat generating device 200 may be easily released to the outside.

More preferably, a Kapton tape having the requirements described above may be preferred, but the insulating layer 400 may be formed of various materials as long as the materials have the requirements described above.

The heat dissipation support 500 may not only serve as a housing covering the insulation support 100 with the heating element 200 interposed therein, the terminal 300, and the insulation layer 400 in an up-down direction but also include a plurality of discharge holes to dissipate heat generated in the heating element 200 by exchanging heat with a fluid through the discharge holes.

More specifically, the heat dissipation support 500 may include an upper heat dissipation support 510 formed to be in close contact with an upper surface of the insulating support 100 and a lower heat dissipation support 520 formed to be in close contact with a lower portion the insulating layer 400.

The upper heat dissipation support 510 includes an upper heat dissipation support body 511 formed to be in close contact with the upper surface of the insulating support 100 to serve as a housing, and a plurality of upper discharge holes 512 as discharge holes dissipating heat are formed on both side surfaces of the upper heat dissipation support body 511.

The lower heat dissipation support 520 includes a lower heat dissipation support body 521 formed to be in close contact with a lower surface of the insulating layer 400 and serving as a housing, and a plurality of lower discharge holes 522 dissipating heat are formed on both side surfaces of the lower heat dissipation support body 521.

That is, the heat dissipation support 500 includes the upper heat dissipation support 510 and the lower heat dissipation support 520, and the upper heat dissipation support body 511 and the lower heat dissipation support body 521 support the insulating support 100 with the heating element 200 interposed therein, the terminal 300, and the insulating layer 400 and outwardly dissipate heat generated in the heating element 200 through the upper discharge holes 512 and the lower discharge holes 522 provided on the both side surfaces of the upper heat dissipation support body 511 and the lower heat dissipation support body 521.

The assembly 600 includes an assembly body 610 and a fixing protrusion 620 formed at the assembly body 610.

The assembly body 610 is located in close contact with a lower surface of the heat dissipation support body 521, and a length thereof may correspond to a length of the upper heat dissipation support 510 and the lower heat dissipation support 520.

The fixing protrusion 620 is provided in plurality, and the plurality of fixing protrusions 620 protrude from the assembly body 610 and are spaced apart from each other in a lengthwise direction. The plurality of fixing protrusions 620 may protrude to pass through the upper discharge holes 512 of the upper heat dissipation support 51 and the lower discharge holes 522 of the lower heat dissipation support 520 and are bent so as to be coupled to an upper surface of the upper heat dissipation support body 521.

In other words, in a state where the fixing protrusions 620 of the assembly 600 pass through the upper discharge holes 512 and the lower discharge holes 522, the assembly body 610 is located to be in close contact with the lower heat dissipation support body 521. In this state, the assembly 600 is bent to be coupled to the upper heat dissipation support body 511, thereby fixing the upper heat dissipation support 510, the insulating support 100 with the heating element 200 interposed therein, the terminal 300, the insulating layer 400, the lower heat dissipation support 520.

The fixing protrusion 620 of the assembly 600 is preferably provided in plurality spaced apart from each other in the lengthwise direction, and the plurality of fixing protrusions 620 spaced apart from each other may be mechanically bent to thereby uniformly fix the upper heat dissipation support 510, the insulating support 100 with the heating element 200 interposed therein, the terminal 300, the insulating layer 400, and the lower heat dissipation support 520 by a casing method or a bonding method.

Second Exemplary Embodiment

Figure 6:
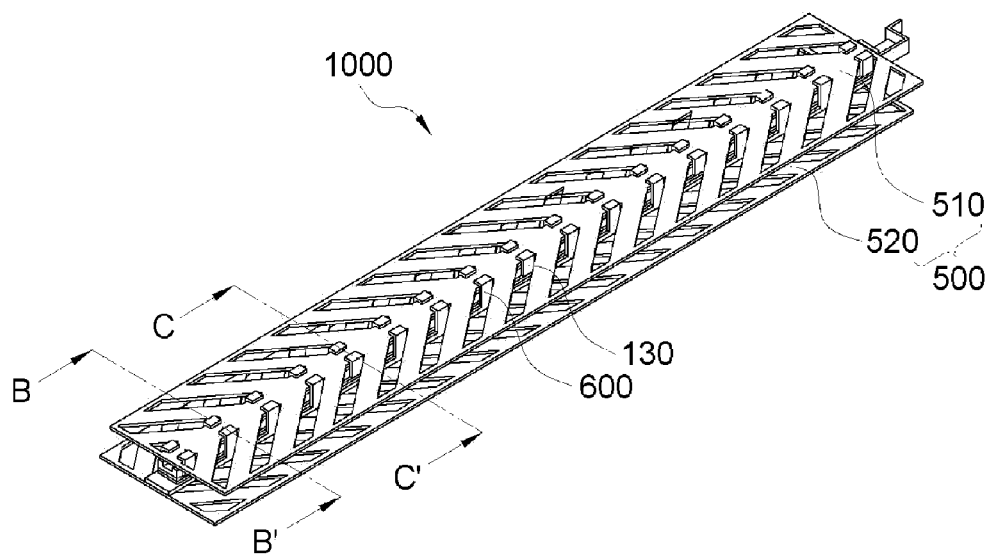
FIG. 6 is a perspective view of a PTC heater according to a second exemplary embodiment of the present disclosure.
Figure 7:
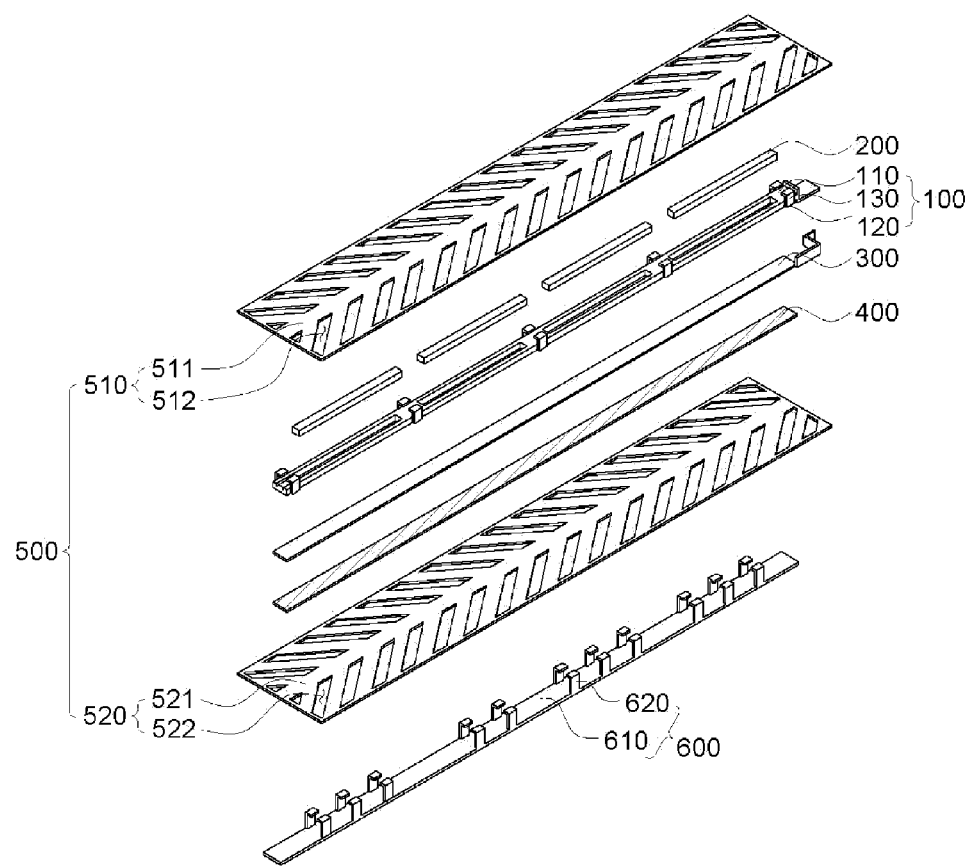
FIG. 7 is an exploded perspective view of the PTC heater according to the second exemplary embodiment of the present disclosure.
Figure 8:
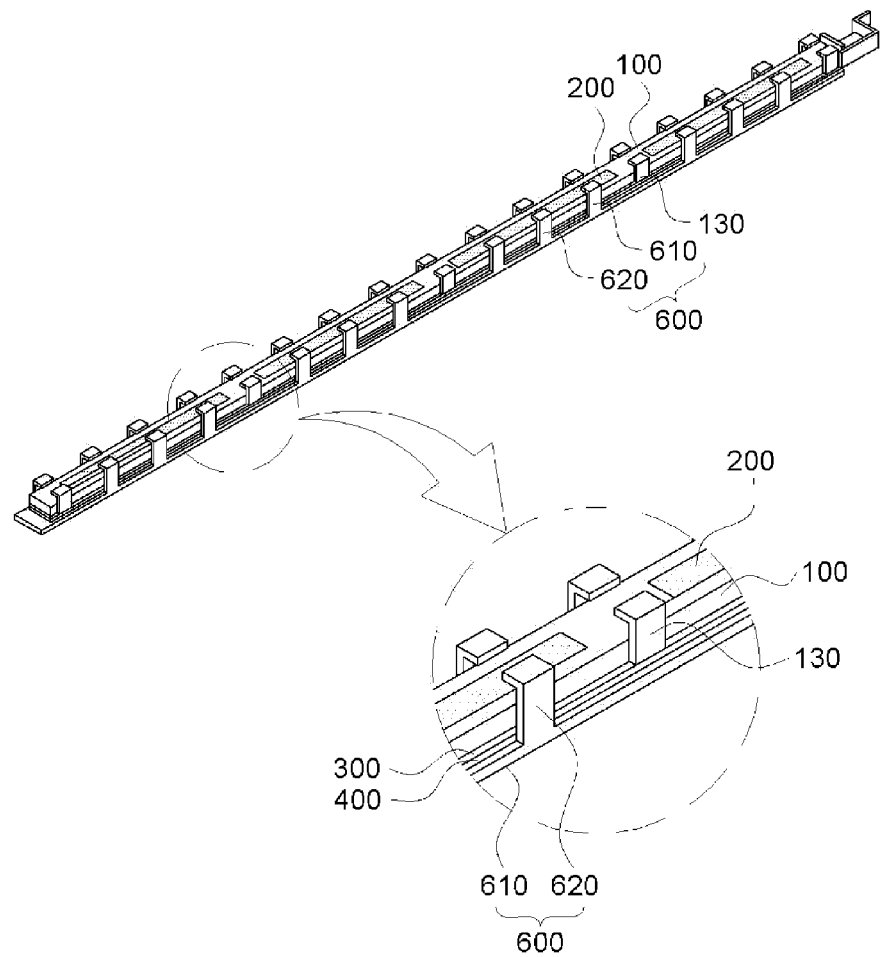
FIG. 8 is a view showing some components of the PTC heater according to the second exemplary embodiment of the present disclosure.
Figure 9:
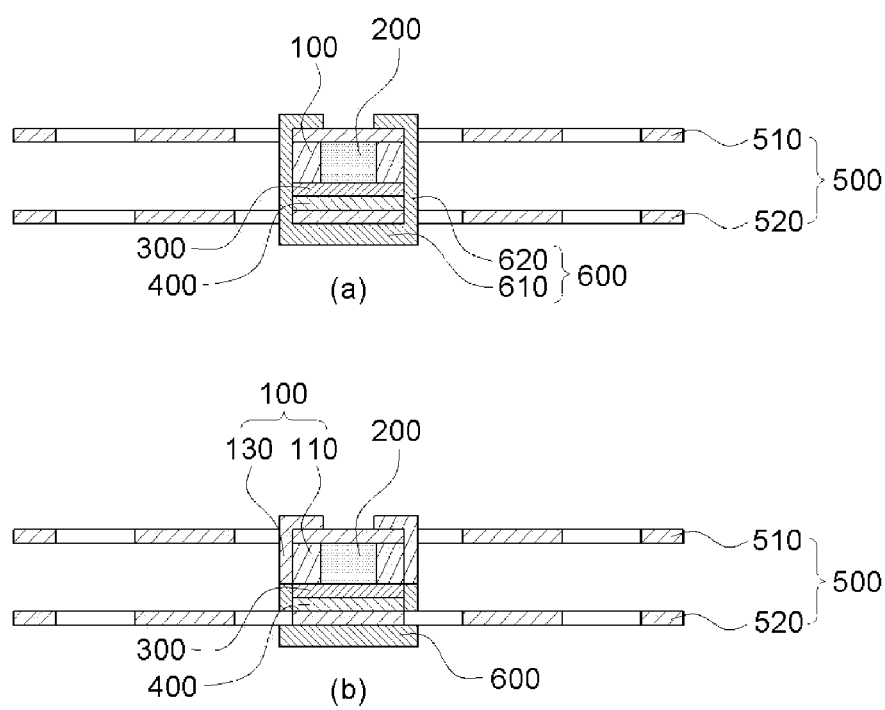
FIG. 9 is a cross-sectional view showing the PTC heater according to the second exemplary embodiment of the present disclosure.

FIG. 6 is a perspective view of a PTC heater according to a second exemplary embodiment of the present disclosure, FIG. 7 is an exploded perspective view of the PTC heater according to the second exemplary embodiment of the present disclosure, FIG. 8 is a view showing some components of the PTC heater according to the second exemplary embodiment of the present disclosure, and FIG. 9 is a cross-sectional view showing the PTC heater according to the second exemplary embodiment of the present disclosure.

The insulating support 100 of the PTC heater 1000 according to the second exemplary embodiment of the present disclosure further includes auxiliary fixing protrusions 130 protruding from the insulating support body 110 to pass through the upper discharge holes 512 of the upper heat dissipation support 510, and bent so as to be coupled to an upper surface of the upper heat dissipation support body 511.

That is, in the PTC heater 1000 according to the second exemplary embodiment of the present disclosure, the upper heat dissipation support 510 and the insulating support 100 with the heating element 200 interposed therein are coupled in advance through the auxiliary fixing protrusions 130, and thereafter, the upper heat dissipation support 510, the insulating support 100, the terminal 300, the insulating layer 400, and the lower heat dissipation support 520 may be coupled through the fixing protrusions 620.

Therefore, since the upper heat dissipation support 510, the insulating support 100, the terminal 300, the insulating layer 400, and the lower heat dissipation support 520 are coupled using the fixing protrusions 620 of the assembly 600 in a state where the insulating support 100 with the heating element 200 interposed therein and the upper heat dissipation support 510 are coupled in advance, in the assembly process of the PTC heater 100, a defect of a product may be minimized.

In particular, since adhesion between the upper heat dissipation support 510 and the heating element 200 is increased through the auxiliary fixing protrusions 130 in addition to the fixing protrusions 620, performance of the PTC heater 100 may be improved, and since parts are prevented from being released when the product is assembled, assembling characteristics may be increased.

In addition, the plurality of auxiliary fixing protrusions 130 are preferably spaced apart from each other in the lengthwise direction so as not to overlap the fixing protrusions 620.

That is, since the fixing protrusions 620 and the auxiliary fixing protrusions 130 are bent in a state of passing through the upper discharge holes 512 of the upper heat dissipation support body 511 and coupled with the upper heat dissipation support body 511, the fixing protrusions 620 and the auxiliary fixing protrusions 130 preferably do not overlap each other.

Here, since the fixing protrusion 620 is to be coupled to the upper heat dissipation support body 511 to fix the upper heat dissipation support 510, the insulating support 100, the terminal 300, the insulating layer 400, and the lower heat dissipation support 520, a larger number of the fixing protrusions 620 than the number of the auxiliary fixing protrusions 130, which is coupled to the upper heat dissipation support body 511 to fix the upper heat dissipation support 510 and the insulating support 100, may be provided.

In addition, since the heating element 200 is to be interposed in the space portion 120 of the insulating support 100, the heating element 200 is preferably formed to be spaced apart from the insulating support body 110 except for the space portion 120 to ensure ease interposition of the heating elements 200, and the fixing protrusions 620 are preferably provided to avoid the auxiliary fixing protrusions 130 provided on the insulating support body 110 except for the space portion 120.

However, if the fixing protrusions 620 and the auxiliary fixing protrusions 130 do not overlap each other and are provided to be easily coupled, the number of the fixing protrusions 620 and the auxiliary fixing protrusions 130 described above is not limited, and formation positions of the auxiliary fixing protrusions 130 are not limited as well and the auxiliary fixing protrusions 130 may be variously located.

Third Exemplary Embodiment

Figure 10:
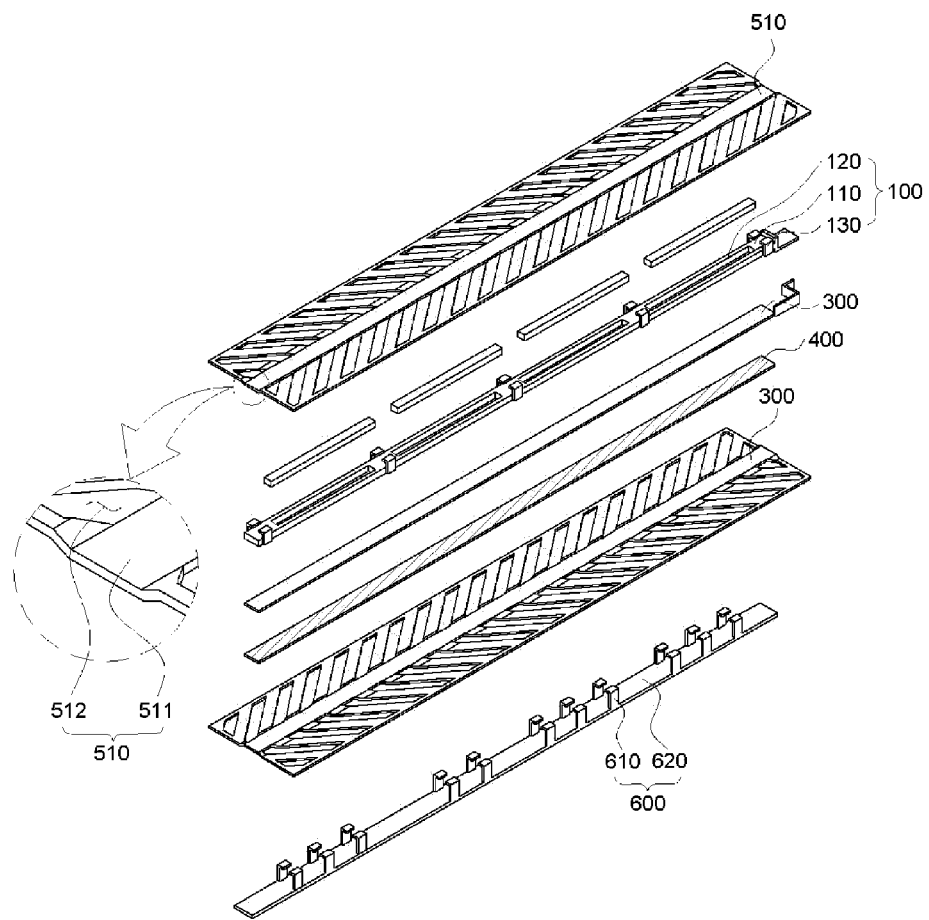
FIG. 10 is an exploded perspective view showing a PTC heater according to a third exemplary embodiment of the present disclosure.
Figure 11:
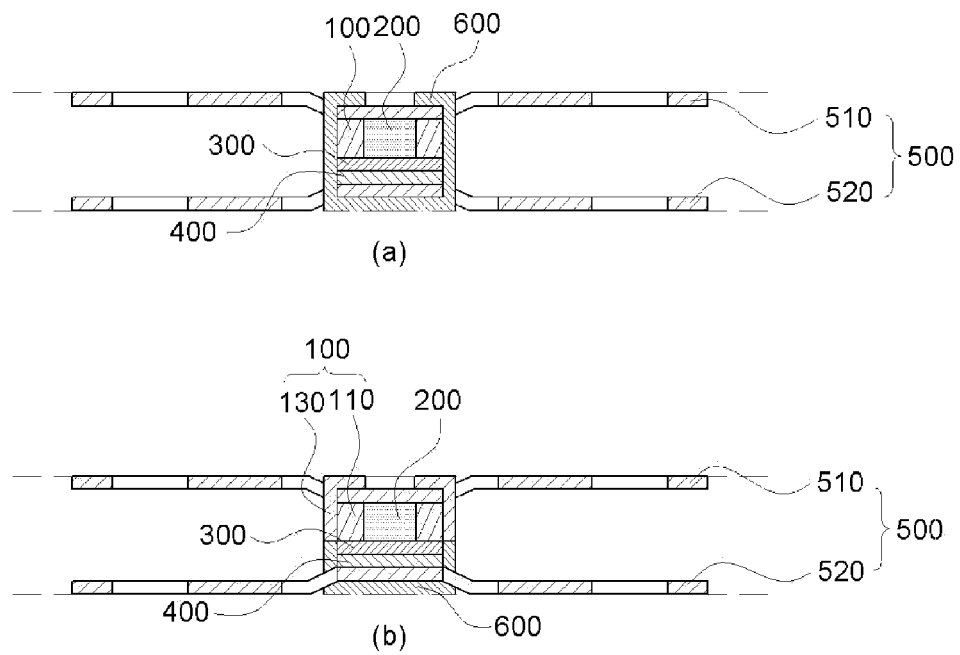
FIG. 11 is a cross-sectional view showing a PTC heater according to the third exemplary embodiment of the present disclosure.
Figure 12:
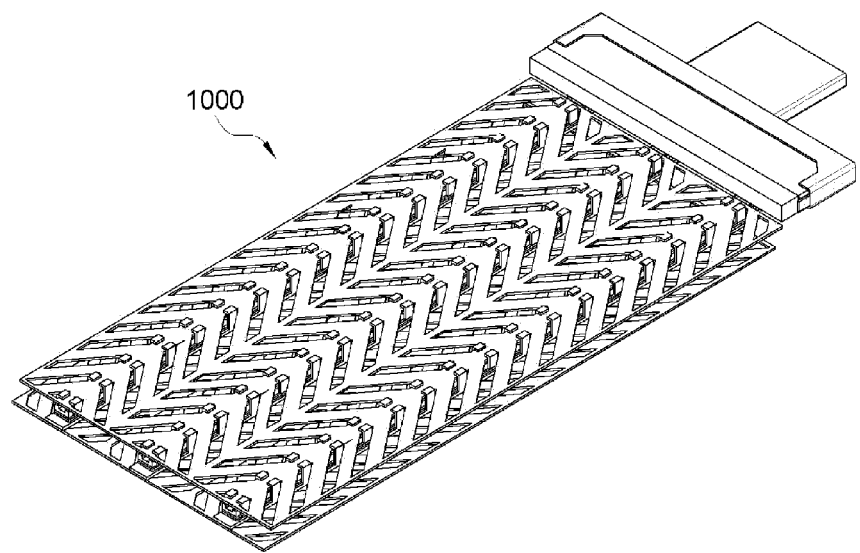
FIGS. 12 and 13 are views showing a modification of a configuration of a PTC heater according to the present disclosure.
Figure 13:
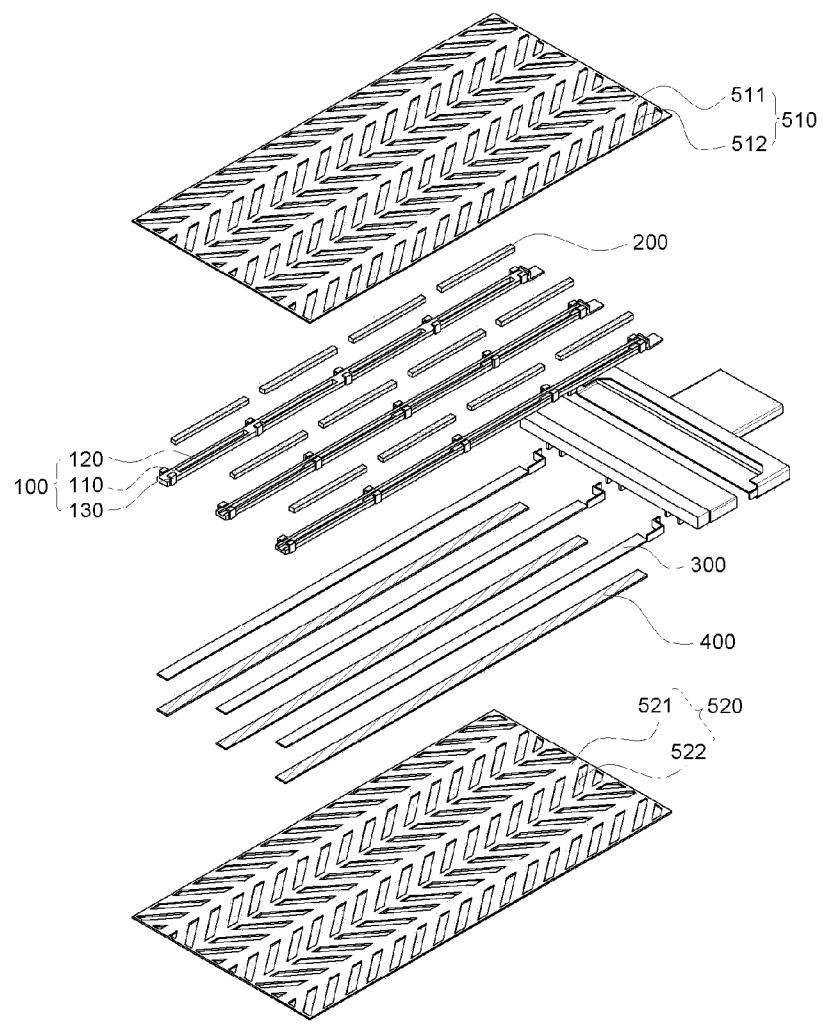

FIG. 10 is an exploded perspective view showing a PTC heater according to a third exemplary embodiment of the present disclosure, FIG. 11 is a cross-sectional view showing a PTC heater according to the third exemplary embodiment of the present disclosure, and FIGS. 12 and 13 are views showing a modification of a PTC heater according to the present disclosure.

As illustrated in FIGS. 10 and 11, in the PTC heater 1000 according to the third exemplary embodiment of the present disclosure, a surface of the upper heat dissipation support body 511 in contact with the insulating support 100 is bent to be located on a lower side and a surface of the lower heat dissipation support body 521 in contact with the insulating layer 400 is bent to be located on an upper side.

That is, in the PTC heater 1000 according to the third exemplary embodiment of the present disclosure, since the surface of the upper heat dissipation support body 511 in contact with the insulating support 100 is bent to be located on the lower side to have a step structure, an increase in a height when coupled with the upper heat dissipation support body 511 through bending of the fixing protrusions 620 and the auxiliary fixing protrusions 130 may be prevented, and since the surface of the surface of the lower heat dissipation support body 521 in contact with the insulating layer 400 is bent to be located on the upper side to have a step structure, an increase in a height due to the assembly body 610 located on a lower surface of the lower heat dissipation support body 521 may be prevented.

In other words, the configuration in which the upper heat dissipation support 510, the insulating support 100, the terminal 300, the insulating layer 400, and the lower heat dissipation support 520 are fixed and coupled using the assembly 600 including the fixing protrusions 620 causes a difference in height due to the assembly 600, which leads to a problem that coupling with other parts and arrangement are not easy.

To avoid the problem, in the PTC heater 1000 according to the third exemplary embodiment of the present disclosure, the fixing protrusions 620 and the assembly 600 including the fixing protrusion 620 may be configured to be located on the same line through the step structure of the upper heat dissipation support body 510 and the lower heat dissipation support body 520, and this makes the PTC heater 1000 compact and improves space utilization in a vehicle to which the product is applied.

In addition, in order to obtain the configuration and effect described above, the surface of the upper heat dissipation support body 511 in contact with the insulating support 100 may be bent so as to be equal to or greater than thicknesses of the fixing protrusions 620 and the auxiliary fixing protrusions 130 so as to be located, and the surface of the lower heat dissipation support body 521 in contact with the insulating layer 400 may be bent so as to be equal to or greater than a thickness of the assembly body 610 so as to be located.

As illustrated in FIGS. 11 and 12, a plurality of PTC heaters 1000 according to the present disclosure may be arranged and connected to a housing and may be used as one heating device.

As an example, the plurality of PTC heaters may be arranged on a plane to form a thin plate shape, or the PTC heaters may be erected and stacked at a predetermined interval so as to be used.

[Detailed Description of Main Elements]

| | |
|---|---|
| 1000: PTC heater | |
| 100: insulating support | 110: insulating support body |
| 120: space portion | 130: auxiliary fixing protrusion |
| 200: heating element | |
| 300: terminal | |
| 400: insulating layer | |
| 500: heat dissipation support | |
| 510: upper heat dissipation support | |
| 511: upper heat dissipation support body | 512: upper discharge hole |
| 520: lower heat dissipation support | |
| 521: lower heat dissipation support body | 522: lower discharge hole |
| 600: assembly | |
| 610: assembly body | 620: fixing protrusion |

What is claimed:

1. A positive temperature coefficient (PTC) heater comprising:
    an insulating support having a predetermined length;
    a heating element interposed in the insulating support and generating heat by power;
    a terminal located in close contact with a lower surface of the insulating support and supplying power to the heating element;
    an insulating layer located in close contact with a lower surface of the terminal;
    an upper heat dissipation support located in close contact with an upper surface of the insulating support and having a plurality of discharge holes to exchange heat from the heating element with a fluid;
    a lower heat dissipation support located in close contact with a lower surface of the insulating layer and having a plurality of discharge holes to exchange heat from the heating element with a fluid; and
    an assembly located in close contact with a lower surface of the lower heat dissipation support, protruding in an upward direction to pass through the discharge holes, and inwardly bent to be coupled to an upper surface of the upper heat dissipation support;
    wherein the insulating support comprises an insulating support body having a predetermined length and a space portion penetrating through upper and lower surfaces inside the insulating support body and allowing the heating element to be interposed therein;
    wherein the upper heat dissipation support includes an upper heat dissipation support body located in close contact with the upper surface of the insulating support and a plurality of upper discharge holes formed on both side surfaces of the upper heat dissipation support body; and
    wherein the lower heat dissipation support includes a lower heat dissipation support body located in close contact with the lower surface of the insulating layer and a plurality of lower discharge holes formed on both side surfaces of the lower heat dissipation support body;
    the assembly comprising:
    an assembly body positioned to be located in close contact with a lower surface of the lower heat dissipation support body; and
    a fixing protrusion protruding from the assembly body to pass through the lower discharge hole and the upper discharge hole and bent to be coupled to an upper surface of the upper heat dissipation support body;
    wherein the fixing protrusion is provided in plurality and the plurality of fixing protrusions are spaced apart from each other in a lengthwise direction;
    wherein a portion of the upper heat dissipation support body coupled with the fixing protrusion is a coupling part, and a portion of the lower heat dissipation support body in close contact with the assembly body is a contacting part;
    wherein the coupling part of the upper heat dissipation support body is downwardly bent so that the fixing protrusion is not upwardly and outwardly protruded beyond the upper surfaces of other portions except the coupling part of the upper heat dissipation support body;
    wherein the contacting part of the lower heat dissipation support body is upwardly bent so that the assembly body is not downwardly and outwardly protruded beyond the lower surfaces of other portions except the contacting part of the lower heat dissipation support body;
    wherein a height of a bent portion of the upper heat dissipation support body is equal to or greater than thickness of the fixing protrusion and the auxiliary fixing protrusion; and
    wherein a height of a bent portion of the lower heat dissipation support body is equal to or greater than a thickness of the assembly body.

2. The PTC heater of claim 1, wherein
the insulating support further comprises an auxiliary fixing protrusion protruding from the insulating support body to pass through the upper discharge hole and bent to be coupled to the upper surface of the upper heat dissipation support body.

3. The PTC heater of claim 2, wherein
the auxiliary fixing protrusion is provided in plurality, and the plurality of auxiliary fixing protrusions are spaced apart from each other in a lengthwise direction.

4. The PTC heater of claim 3, wherein
the auxiliary fixing protrusions are spaced apart from each other so as not to overlap the fixing protrusion.

5. The PTC heater of claim 4, wherein
the auxiliary fixing protrusions are formed to avoid the space portion.

6. The PTC heater of claim 1, wherein
the terminal has a length equal to a length of the insulating support body and is connected to a plurality of the heating elements.

7. The PTC heater of claim 1, wherein
the insulating layer is formed of an insulating material.

* * * * *